J. N. PARKER.
MOTOR PLOW.
APPLICATION FILED OCT. 18, 1911.
1,073,513.
Patented Sept. 16, 1913.
2 SHEETS—SHEET 1.
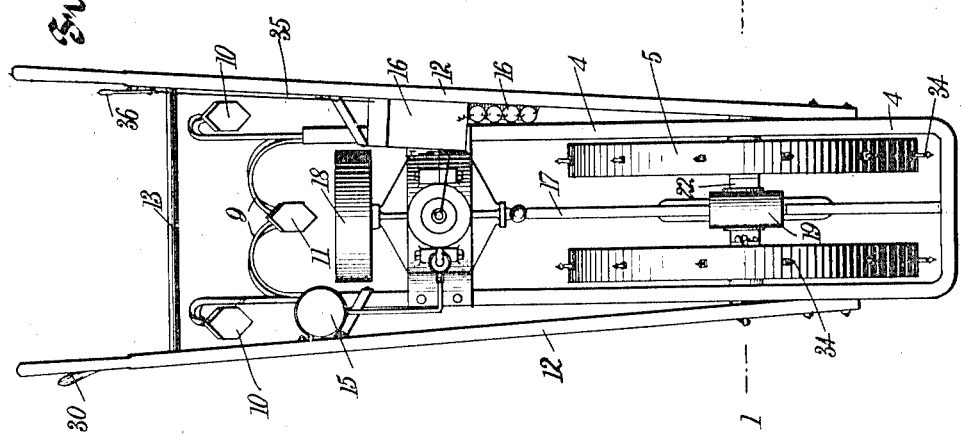
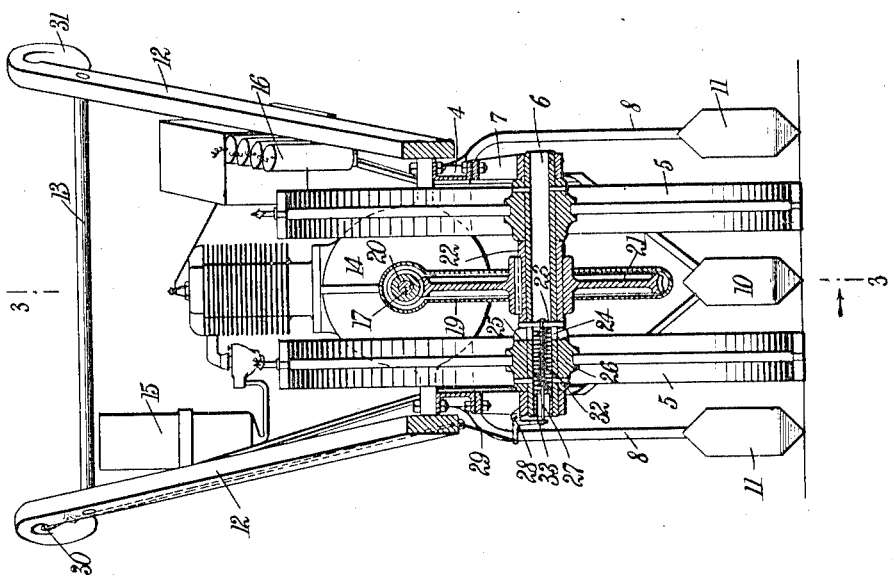
WITNESSES
Benedict Joff
W. S. Orton.
INVENTOR
Joseph N. Parker
BY
Munn Co
ATTORNEYS

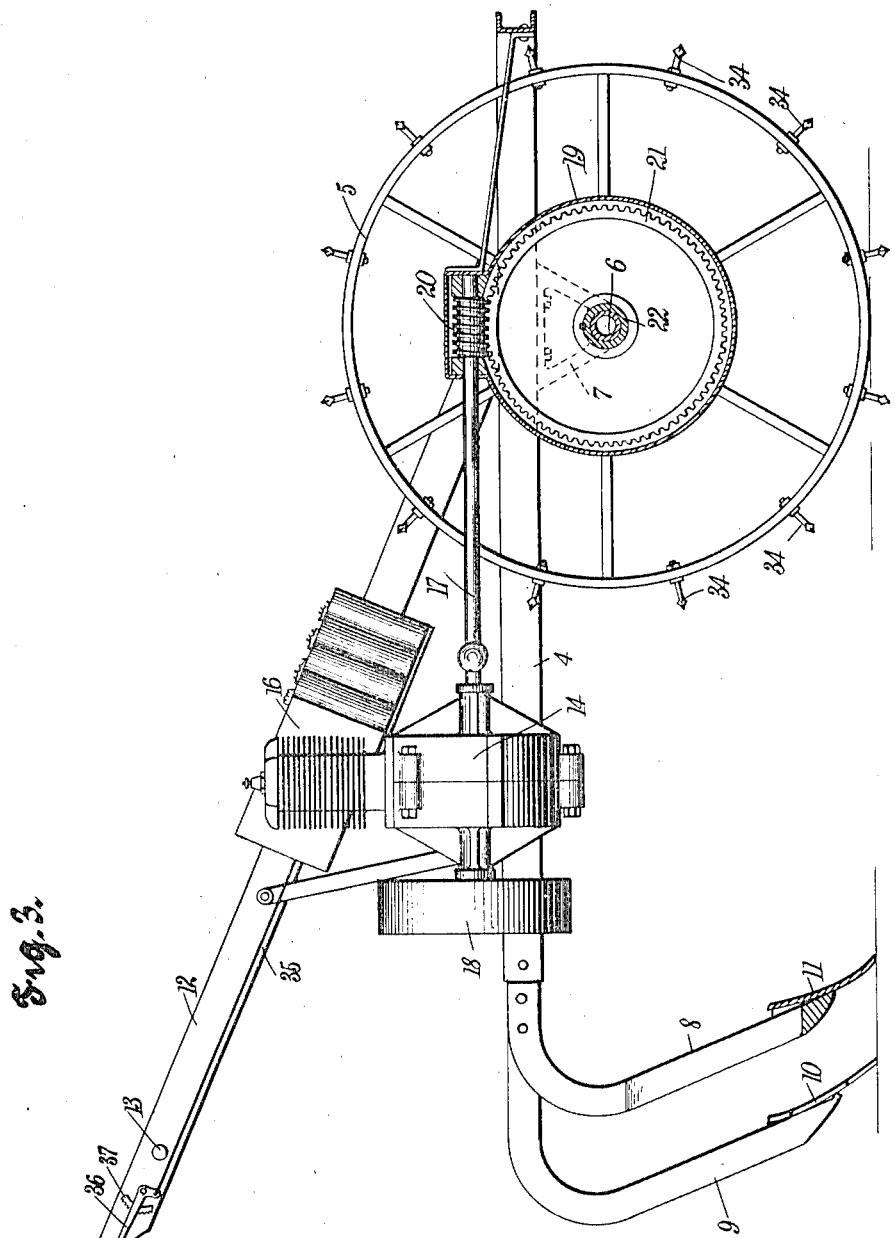

UNITED STATES PATENT OFFICE.

JOSEPH NICHOLAS PARKER, OF BEDFORD CITY, VIRGINIA.

MOTOR-PLOW.

1,073,513.

Specification of Letters Patent.   Patented Sept. 16, 1913.

Application filed October 18, 1911.   Serial No. 655,270.

*To all whom it may concern:*

Be it known that I, JOSEPH N. PARKER, a citizen of the United States, and a resident of Bedford City, in the county of Bedford and State of Virginia, have invented a new and Improved Motor-Plow, of which the following is a full, clear, and exact description.

My invention relates to a motor-driven plow, and an object of my invention is to provide a plow of simple and effective construction, the traction wheels of which may be coupled to the driving mechanism at will.

A further object of my invention is to provide a device of the above-indicated character, in which the power is transmitted equally to all of the traction wheels through a centrally-disposed drive.

A further object of my invention is to dispose the shanks carrying the tools in such position relative to the machine, that furrows may be formed offset to one side of the machine.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings forming a part of this specification, in which similar characters of reference indicate corresponding parts in all the figures, and in which—

Figure 1 is a transverse sectional view taken on the line 1—1 of Fig. 2 and showing a preferred embodiment of my invention; Fig. 2 is a plan view looking down upon the device shown in Fig. 1; and Fig. 3 is a longitudinal sectional view taken on the line 3—3 of Fig. 1 and looking in the direction of the arrow.

A horizontally disposed U-shaped frame 4 has positioned therein, a pair of spaced-apart traction wheels 5 rigidly mounted upon a hollow axle 6, said axle having its opposite ends supported in brackets 7 depending from each arm of the frame 4. Each of the rear free ends of the frame has adjustably mounted thereon, a shank 8 offset outside of a plane containing the adjacent traction wheel 5, and also extending from each of the free ends of the frame is a depending shank 9, said shanks 9 meeting to form a support for a furrowing tool or plow shaft 10; likewise, a tool 11 is positioned at the lower end of each of the shanks 8. Handle members 12 are attached to each side of the frame 4, and projecting upwardly, rearwardly and divergently, and connected together by means of a brace rod 13 mounted between the sides of the frame 4, and between the wheels and shanks 8 is a motor 14, preferably an air-cooled internal combustion engine having a gasolene or other fuel tank 15 and a sparking battery 16, which motor is coupled to a drive shaft 17 having rigidly affixed to one end and to the rear of the motor 14, a fly wheel 18, the opposite end of which drive shaft extends forwardly to a position between the wheels 5. The forward end of the drive shaft 17 projects into a casing concentrically disposed about the axle 6 and positioned between the wheels 5. Adjacent the front end of the shaft 17 is rigidly mounted a worm 20 permanently in mesh with the teeth of a gear 21, which gear is splined to a sleeve 22 loosely mounted on the axle 6 and affording means for spacing apart the wheels 5. One end of the sleeve 22 is slotted to receive a pin 23, which pin is slidably mounted in the slot 24 within the axle 6 and adapted to engage a ratchet clutch 25 extending from the hub 26 of the adjacent wheel 5.

It is to be noted that motion is normally transmitted from the gear 21 through the sleeve 22, and pin 23 to the axle 6, thereby to rotate the traction wheels 5. By withdrawing the pin 23 out of its engagement with the sleeve 22, the gear 21 may continue to rotate without actuating the wheels; to permit of this withdrawal, a rod 27 has one end attached to the pin 23 and its opposite end pivoted to one arm of a bell crank lever 28 mounted on the brackets 7, the other arm of which bell crank lever is connected to a reach rod 29 extending along one of the handle members 12 and attached to a hand lever 30 adjacent the handle 31 of one of the members 12. The pin 23 is normally maintained in engagement with the sleeve 22 by a compression spring 32 surrounding the rod 27 and disposed within the bore of the axle 6, having one end bearing on the pin 23 and the opposite end bearing on a cap 33 inserted within the outer end of the bore of the axle 6. In order to permit the wheels to bite into the ground, prongs 34 extend from the periphery of each of the wheels.

The engine is started by any suitable means attached to a reach rod 35 extending along one of the handle members 12 and actuated by a lever 36 moving over a segmental arc 37.

Having thus described my invention, I claim as new and desire to secure by Letters Patent:

1. In a motor plow, a U-shaped frame having handles secured to its forward part and connected with the rear part thereof by braces, an axle mounted on the under side of the forward part of the frame in rear of the point of attachment of the handles, a pair of traction wheels rigidly mounted on the axle within the frame and spaced apart, a gear casing on the axle between the traction wheels, a gear wheel loosely mounted on the axle within the casing, a motor mounted in the rear part of the frame between the handles, and having its shaft extending into the said casing, a worm on the shaft and meshing with the said gear wheel, a clutch for connecting the gear wheel with the axle, and means for operating the clutch from the outer end of one of the handles.

2. In a motor plow, a frame having handles secured to its forward part and connected to the rear part thereof by braces, an axle mounted in the forward part of the frame, a pair of traction wheels fixedly mounted on the axle within the frame and spaced apart, a gear wheel loosely mounted on the axle between the traction wheels, a motor mounted in the rear part of the frame, a shaft coupled to the motor and having a worm on its forward end meshing with the gear wheel on the axle, a clutch connecting the gear wheel with the axle, and means for operating the clutch from one of the outer ends of one of the handles.

3. In a motor plow, a frame, having handles secured to its forward end and connected with the rear portion thereof by braces, an axle mounted in the forward part of the frame, a pair of spaced traction wheels fixedly mounted on the axle within the frame, a sleeve loosely mounted on the axle between the wheels, a gear wheel secured to the sleeve, a clutch for connecting the sleeve with the axle, means for operating the clutch from the outer end of one of the handles, a motor on the rear part of the frame, and means for operating the gear wheel on the axle from the motor.

4. In a motor plow, a frame provided with handles, an axle mounted in the forward end of the frame, spaced traction wheels fixedly mounted on the axle, a gear wheel loosely mounted on the axle between the traction wheels, a clutch for connecting the wheel with the axle, means for operating the clutch from the outer end of one of the handles, a motor on the rear part of the frame, means for operating the gear wheel on the axle from the motor, and means for controlling the motor from the outer end of the other handle.

In testimony whereof I have signed my name to this specification in the presence of two subscribing witnesses.

JOSEPH NICHOLAS PARKER.

Witnesses:
R. E. WHITE,
S. M. BREAZEAL.